US012267680B2

(12) United States Patent
Paczkowski

(10) Patent No.: US 12,267,680 B2
(45) Date of Patent: *Apr. 1, 2025

(54) WIRELESS COMMUNICATION SERVICE OVER AN EDGE DATA NETWORK (EDN) BETWEEN A USER EQUIPMENT (UE) AND AN APPLICATION SERVER (AS)

(71) Applicant: T-MOBILE INNOVATIONS LLC, Overland Park, KS (US)

(72) Inventor: Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,093

(22) Filed: Jan. 5, 2024

(65) Prior Publication Data

US 2024/0147578 A1 May 2, 2024

Related U.S. Application Data

(63) Continuation of application No. 17/377,610, filed on Jul. 16, 2021, now Pat. No. 11,889,593.

(51) Int. Cl.
H04W 12/102 (2021.01)
H04W 4/50 (2018.01)
H04W 12/60 (2021.01)
H04W 84/02 (2009.01)
H04W 88/16 (2009.01)
H04W 92/04 (2009.01)

(52) U.S. Cl.
CPC ........... *H04W 12/102* (2021.01); *H04W 4/50* (2018.02); *H04W 12/66* (2021.01); *H04W 84/02* (2013.01); *H04W 88/16* (2013.01); *H04W 92/04* (2013.01)

(58) Field of Classification Search
CPC .................................. H04W 4/50–80
See application file for complete search history.

(56) References Cited

U.S. PATENT DOCUMENTS 10,334,446 B2  6/2019  Ashrafi
10,492,119 B2  11/2019 Tan
10,594,456 B2  3/2020  Park et al.
(Continued)

OTHER PUBLICATIONS

"3rd Generation Partnership Project; Technical Specification Group Services and System Aspects; Study on application architecture for enabling Edge Applications; (Release 17)"; 3GPP TR 23.758; Dec. 2019; pp. 1-113; V17.0.0; 3GPP; Sophia Antipolis, France.

*Primary Examiner* — San Htun

(57) ABSTRACT

A data communication network connects a user application in a wireless User Equipment (UE) to a user application server. An edge application server exchanges user data between the user application in a wireless UE and a wireless network slice. The wireless network slice exchanges the user data between the edge application server and the user application server. The data communication network determines a trust level for the exchange of the user data between the user application in the wireless UE and the user application server. In some examples, a distributed ledger in the data communication network determines the trust level for the exchange of the user data between the user application in the wireless UE and the user application server.

20 Claims, 13 Drawing Sheets

(56) References Cited

U.S. PATENT DOCUMENTS

| | | | |
|---|---|---|---|
| 10,813,136 B2 | 10/2020 | Yerramalli et al. | |
| 2018/0239897 A1* | 8/2018 | Ventura | G06F 21/57 |
| 2019/0320322 A1 | 10/2019 | Jayawardene et al. | |
| 2020/0204444 A1 | 6/2020 | Marquardt et al. | |
| 2021/0007166 A1 | 1/2021 | Liao et al. | |
| 2021/0014132 A1 | 1/2021 | Smith et al. | |
| 2021/0111953 A1* | 4/2021 | Hall | H04W 36/322 |
| 2021/0185040 A1 | 6/2021 | Paczkowski et al. | |
| 2021/0307089 A1* | 9/2021 | Kim | H04W 4/50 |
| 2021/0360401 A1* | 11/2021 | Marinho | H04W 12/069 |
| 2022/0217540 A1* | 7/2022 | Choyi | H04L 63/20 |

* cited by examiner

WIRELESS COMMUNICATION SERVICE OVER AN EDGE DATA NETWORK (EDN) BETWEEN A USER EQUIPMENT (UE) AND AN APPLICATION SERVER (AS)

RELATED CASES

This United States patent application is a continuation of U.S. patent application Ser. No. 17/377,610 that was filed on Jul. 16, 2021 and is entitled "WIRELESS COMMUNICATION SERVICE OVER AN EDGE DATA NETWORK (EDN) BETWEEN A USER EQUIPMENT (UE) AND AN APPLICATION SERVER (AS)." U.S. patent application Ser. No. 17/337,610 is hereby incorporated by reference into this United States patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), User Plane Functions (UPFs), Network Exposure Functions (NEFs), and the like. Some network elements like UPFs are grouped into wireless network slices. An individual wireless user device may request a specific wireless network slice.

Although network elements are often concentrated in the wireless network cores, network elements are also deployed in Edge Data Networks (EDNs) that are near the wireless access nodes. In particular, Edge Application Servers (EAS) in the EDNs interact with the wireless user devices over the wireless access nodes to serve hosted-computing, augmented reality, and other low-latency data services. A user application in a wireless user device is coupled to an EAS in the EDN, and communication performance between the user application and the EAS is monitored and controlled to maintain proper session quality for the user application.

In the EDNs, the EAS are controlled by Edge Enablement Servers (EES) that drive the EAS to deliver the low-latency data services. The wireless user devices have Edge Enablement Clients (EECs) that interact with the user applications and with the EES. The EES exposes the EAS to the EECs in the wireless user devices. The user applications then exchange user data with the EAS over the wireless access nodes under the control and support of the EECs in the wireless user devices and the EES in the EDNs. The EES monitors network performance to influence traffic through the NEFs in a similar manner to AFs. The EES also instantiates and controls the EAS. An Edge Configuration Server (ECS) may be used. The ECS helps pair the EECs in the wireless user devices with the EES in the EDN. The ECS may operate like an AF.

The EDNs feature reference points called EDGES. EDGE-1 is between an EEC in a wireless user device and an EES in the EDN. EDGE-1 supports EEC registration, EAS discovery, and EAS configuration. EDGE-2 is between an EES in the EDN and a network function (NEF, SMF, PCF) in the network core. EDGE-2 supports the discovery and subscription to 3GPP network capabilities like UE location and session quality. EDGE-3 is between an EES and EAS in the EDN. EDGE-3 supports EAS registration and session quality control. EDGE-4 is between an EEC in the wireless user device and an ECS. EDGE-4 supports EEC provisioning by the ECS and EEC info delivery to the ECS. EDGE-5 is between an EEC in the wireless user device and the EES in the EDN. EDGE-5 supports interactions between the user application and the EDN. EDGE-6 is between an ECS and the EES. EDGE-6 supports EES configuration and conveys EES information to the ECS. EDGE-7 is between an EAS in the EDN and a network function (NEF, SMF, PCF) in the network core. EDGE-7 supports the discovery and subscription to 3GPP network capabilities like UE location and session quality. EDGE-8 is between an ECS and a Network Function (NEF, SMF, PCF) in the network core. EDGE-8 supports the discovery and subscription to 3GPP network capabilities like UE location and session quality. EDGE-9 is between two EES and supports service continuity during UE mobility.

Unfortunately, the EDNs lack effective security. Moreover, the EDNs inefficiently record EDN transactions.

TECHNICAL OVERVIEW

In some examples, a data communication network connects a user application in a wireless User Equipment (UE) to a user application server as follows. An edge application server exchanges user data between the user application in a wireless UE and a wireless network slice. The wireless network slice exchanges the user data between the edge application server and the user application server. The data communication network determines a trust level for the exchange of the user data between the user application in the wireless UE and the user application server. In some examples, a distributed ledger in the data communication network determines the trust level for the exchange of the user data between the user application in the wireless UE and the user application server.

In some examples, a data communication network connects a user application in a wireless UE to a user application server as follows. A user gateway exchanges user data between the user application in the wireless UE and an edge data network. The edge data network exchanges the user data between the user gateway and a core data network. The core data network exchanges the user data between the edge data network and the user application server. A distributed ledger determines a trust level for the exchange of the user data between the user application in the wireless UE and the user application server.

DESCRIPTION OF THE DRAWINGS

FIG. 10 illustrates an exemplary operation of the 5G wireless communication network to connect the user application to the AS.

FIG. 11 illustrates an exemplary operation of a network control-plane in the 5G wireless communication network to connect the user application to the AS.

FIG. 12 illustrates an exemplary operation of an edge control-plane in 5G wireless communication network to connect the user application to the AS.

FIG. 13 illustrates an exemplary operation of a user-plane in 5G wireless communication network to connect the user application to the AS.

DETAILED DESCRIPTION

Figure 1:
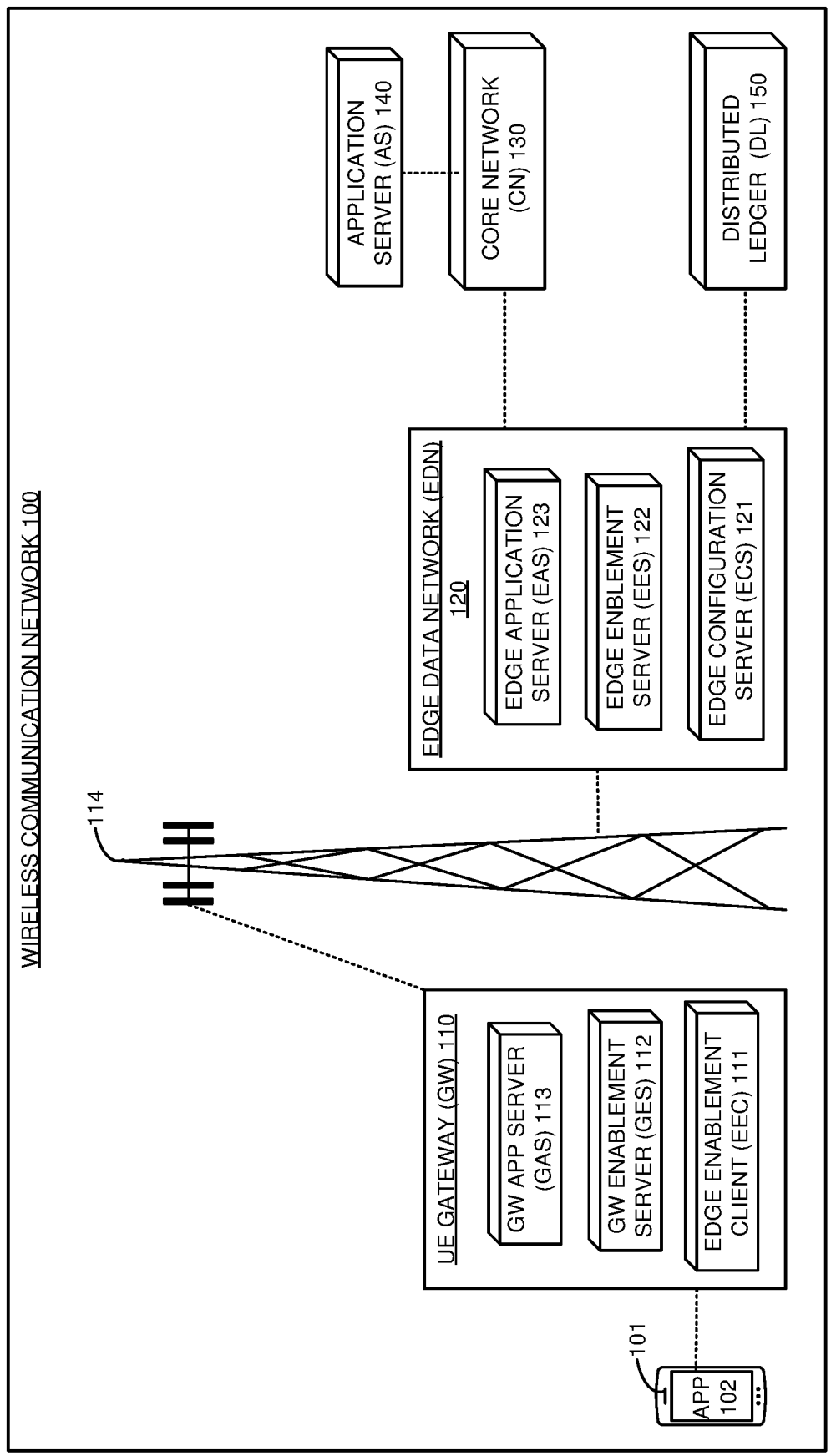
FIG. 1 illustrates a wireless communication network to connect a user application in a User Equipment (UE) to an Application Server (AS) over a UE gateway (GW), Radio Access Network (RAN), Edge Data Network (EDN), and Core Network (CN).

FIG. 1 illustrates wireless communication network 100 to connect User Application (APP) 102 in User Equipment (UE) 101 to Application Server (AS) 140. Wireless communication network 100 comprises UE 101, UE gateway (GW) 110, Radio Access Network (RAN) 114, Edge Data Network (EDN) 120, Core Network (CN) 130, and AS 140. UE 101 comprises a computer, phone, vehicle, sensor, robot, or some other data appliance with communication circuitry. Wireless communication network 100 delivers wireless data services to APP 102 in UE 101 like hosted-computing, augmented-reality, or some other edge-supported network product. Wireless communication network 100 is simplified and typically includes more UEs, RANs, EDNs, and AS than shown.

Various examples of network operation and configuration are described herein. In some examples, wireless communication network 100 connects APP 102 to AS 140 to deliver a service to UE 101 like hosted-computing or augmented reality. CN 130 exchanges EDGE-8 signaling with ECS 121 to expose network capabilities. CN 130 exchanges EDGE-2 signaling with GES 112 and EES 122 to expose network capabilities. CN 130 exchanges EDGE-7 signaling with GAS 112 and EAS 122 to configure GAS 112 and EAS 122. EEC 111 in GW 110 and ECS 121 in EDN 120 exchange EDGE-4 signaling to provision EEC 111 with network information like EES, data network name, and slice identifier. GES 112 in GW 110 and ECS 121 in EDN 120 exchange EDGE-6 signaling to configure GES 111 and convey GES information to ECS 121. EES 122 and ECS 121 in EDN 120 exchange EDGE-6 signaling to configure EES 122 and convey EES information to ECS 121.

UE 101 executes APP 102. APP 102 and EEC 111 in GW 110 exchange EDGE-5 signaling to initiate service for APP 102 over GES 112 and EES 122. EEC 111 and GES 112 in GW 110 exchange EDGE-1 signaling to register UE 101 and discover GAS 113, EAS 123, and AS 140. In addition, GES 112 and EES 122 exchange EDGE-9 signaling to register UE 101 and discover GAS 113, EAS 123, and AS 140. GES 112 and GAS 113 exchange EDGE-3 signaling to set-up a user data session through GAS 113. EES 122 and EAS 123 exchange EDGE-3 signaling to set-up the user data session through EAS 123. APP 102 and GAS 113 exchange user data responsive to the EDGE-3 signaling from GES 112 and the EDGE-5 signaling from EEC 111. GAS 113 and EAS 123 exchange the user data responsive to the EDGE-3 signaling from GES 112 and EES 122. EAS 123 and CN 130 exchange the user data responsive to the EDGE-3 signaling from EES 122. CN 130 and AS 140 exchange the user data. Typically, GAS 113 performs the lowest-latency tasks to deliver service to APP 102 in UE 101. EAS 123 performs additional low-latency tasks to deliver the service to APP 102 in UE 101. AS 113 tasks that do not require low-latency to deliver service to APP 102 in UE 101.

EES 122 and CN 130 exchange EDGE-2 signaling to determine network information like identifiers and addresses that characterizes the data exchange between APP 102 to AS 140. CN 130 transfers the network information to Digital Ledger (DL) 150. DL 150 determines trust for the APP 102, GW 110, RAN 114, EDN 120, and CN 130 based on the network information. For example, DL 150 may match the UE Identifier (ID), GW ID, EDN ID, CN ID, and AS ID and their corresponding network addresses against authorized combinations of the IDs and addresses to determine trust. DL 150 may use Minimum Viable Consensus (MVC) to determine trust based on the network information. EAS 123 may exchange the user data with a wireless network slice in CN 130 that comprises a User Plane Function (UPF). EAS 123, GAS 113, and AS 140 may also be part of the same network slice. The slice identifier may be part of the network information that is used to determine trust.

CN 130 may transfer the network information to DL 150 over a Network Exposure Function (NEF) and a Security Control Function (SCF). A Network Exposure Function (NEF) in CN 130 may exchange the EDGE-8 signaling, EDGE-2 signaling, and EDGE-7 signaling with EDN 120. EDN 120 and GW 110 may comprise Mobile Edge Compute (MEC) platforms and applications that support GES 112, GAS 113, EES 122, and EAS 123.

CN 130 comprises network elements like Access and Mobility Management Function (AMF), Session Management Function (SMF), Network Exposure Function (NEF), Network Slice Selection Function (NSSF), User-Plane Function (UPF), and Application Function (AF). GW 110 communicates with RAN 114 over technologies like Fifth Generation New Radio (5GNR), Long Term Evolution (LTE), Institute of Electrical and Electronic Engineers (IEEE) 802.11 (WIFI), Bluetooth, or some other wireless communication protocol. The various communication links in wireless communication network 100 are represented by dotted lines on FIG. 1 and use metallic wiring, glass fibers, radio channels, or some other communication media. These communication links use IEEE 802.3 (Ethernet), Time Division Multiplex (TDM), Data Over Cable System Interface Specification (DOCSIS), WIFI, 5GNR, LTE, Internet Protocol (IP), General Packet Radio Service Transfer Protocol (GTP), virtual switching, inter-processor communication, bus interfaces, and/or some other data communication protocols. UE 101 and GW 110 may communicate using one of the above protocols or some other protocol.

UE 101, GW 110, RAN 114, EDN 120, CN 130, AS 140, and DL 150 comprise microprocessors, software, memories, transceivers, bus circuitry, and the like. GW 110, RAN 114, and typically UE 101 also comprise radios. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
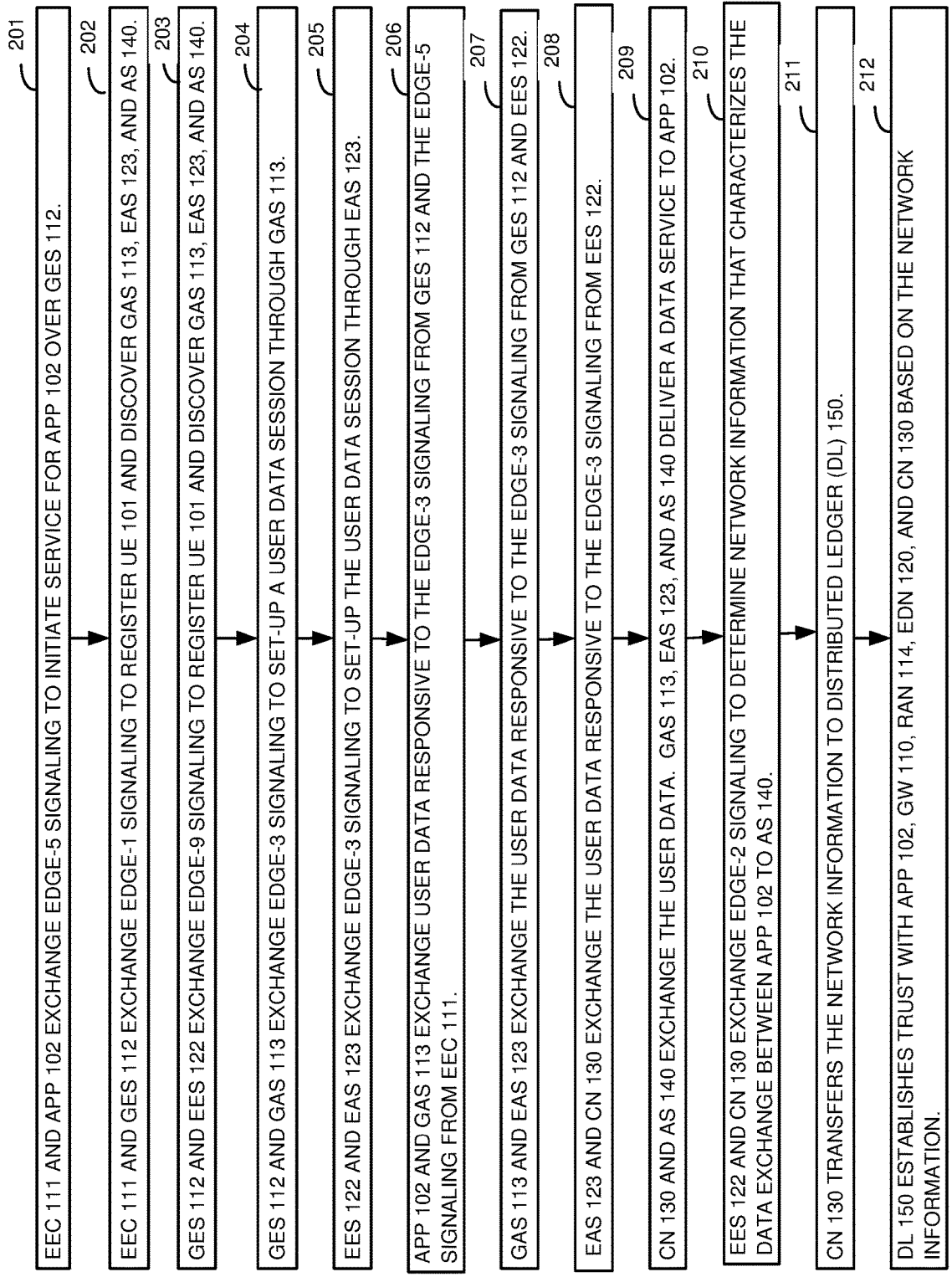
FIG. 2 illustrates an exemplary operation of the wireless communication network to connect the user application in the UE to the AS over the GW, RAN, EDN, and CN.

FIG. 2 illustrates an exemplary operation of wireless communication network 100 to connect APP 102 in UE 101 to AS 140. The operation may vary in other examples. APP 102 and EEC 111 exchange EDGE-5 signaling to initiate service for APP 102 over GES 112 (201). EEC 111 and GES 112 exchange EDGE-1 signaling to register UE 101 and discover GAS 113, EAS 123, and AS 140 (202). GES 112 and EES 122 also exchange EDGE-9 signaling to register UE 101 and discover GAS 113, EAS 123, and AS 140 (203). GES 112 and GAS 113 exchange EDGE-3 signaling to set-up a user data session through GAS 113 for APP 102 (204). EES 122 and EAS 123 exchange EDGE-3 signaling to set-up the user data session through EAS 123 for APP 102 (205). APP 102 and GAS 113 exchange user data responsive to the EDGE-3 signaling from GES 112 and the EDGE-5 signaling from EEC 111 (206). GAS 113 and EAS 123 exchange the user data responsive to the EDGE-3 signaling from GES 112 and EES 122 (207). EAS 123 and CN 130 exchange the user data responsive to the EDGE-3 signaling from EES 122 (208). CN 130 and AS 140 exchange the user data, and GAS 113, EAS 123, and AS 140 deliver a data service to APP 102 like hosted-computing (209). EES 122 and CN 130 exchange EDGE-2 signaling to determine network information that characterizes the data exchange between APP 102 to AS 140 (210). CN 130 transfers the network information to Distributed Ledger (DL) 150 (211). DL 150 establishes trust with APP 102, GW 110, RAN 114, EDN 120, and CN 130 based on the network information (212).

Figure 3:
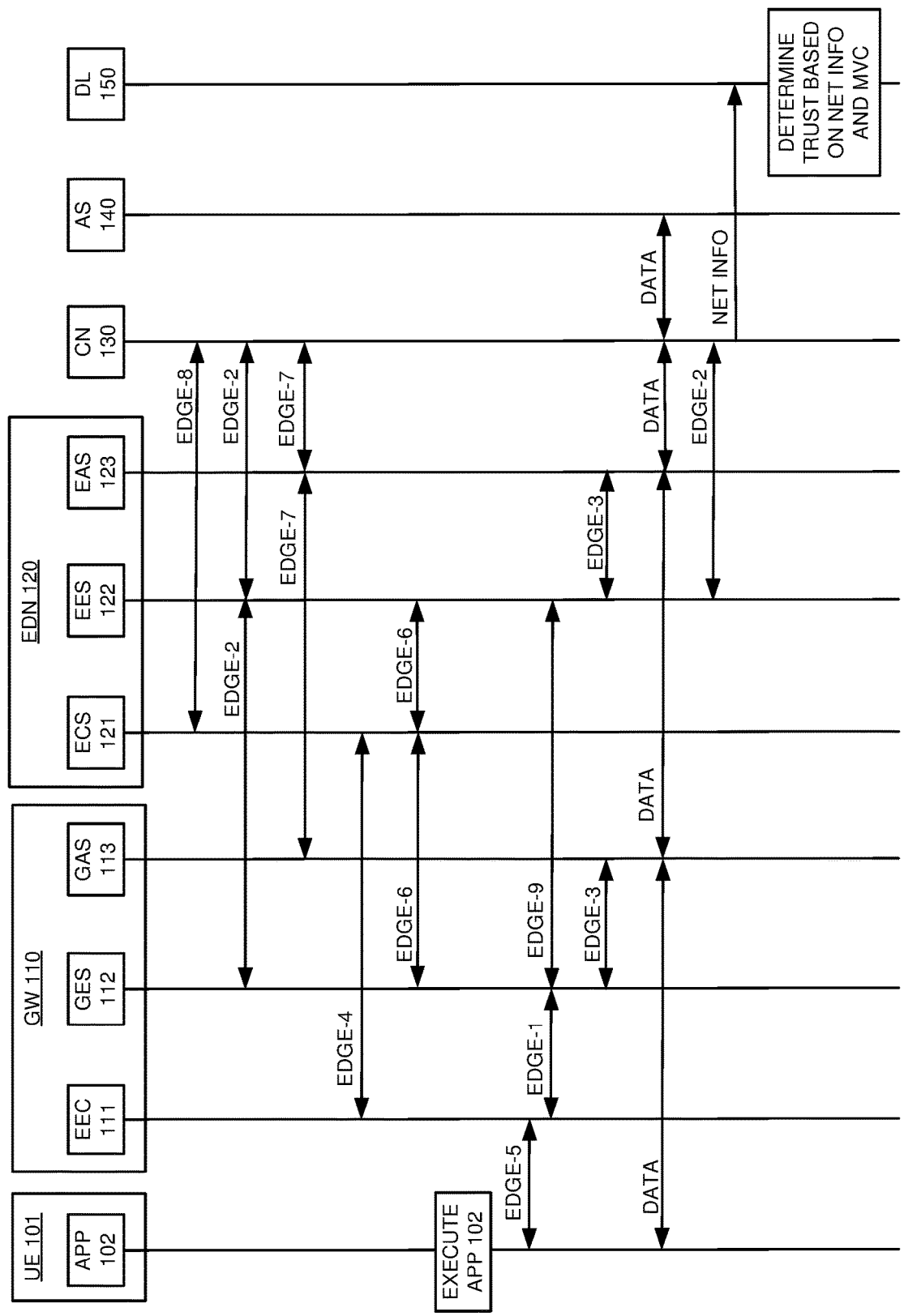
FIG. 3 illustrates an exemplary operation of the wireless communication network to connect the user application in the UE to the AS over the GW, RAN, EDN, and CN.

FIG. 3 illustrates an exemplary operation of wireless communication network 100 to connect APP 102 in UE 101 to AS 140. The operation may vary in other examples. CN 130 and ECS 121 exchange EDGE-8 signaling to transfer ECS information to CN 130 and to expose network capabilities to ECS 121 like UE location reporting and session quality control. CN 130 and EES 122 exchange EDGE-2 signaling to expose network capabilities to EES 122 and transfer EES information to CN 130. EES 122 and GES 112 exchange EDGE-2 signaling to expose network capabilities to GES 112 and transfer GES information to CN 130. CN 130 and EAS 122 exchange EDGE-7 signaling to configure EAS 122 and transfer EAS information to CN 130. EAS 122 and GAS 112 exchange EDGE-7 signaling to configure GAS 122 and transfer GAS information to CN 130. EEC 111 in GW 110 and ECS 121 in EDN 120 exchange EDGE-4 signaling to provision EEC 111 and to discover network information like EES, data network name, and slice from ECS 121. EES 122 and ECS 121 in EDN 120 exchange EDGE-6 signaling to configure EES 122 and transfer EES information to ECS 121. GES 112 in GW 110 and ECS 121 in EDN 120 exchange EDGE-6 signaling to configure GES 111 and transfer GES information to ECS 121.

UE 101 executes APP 102. APP 102 and EEC 111 in GW 110 exchange EDGE-5 signaling to initiate service for APP 102 over GES 112 in GW 110. EEC 111 and GES 112 exchange EDGE-1 signaling to register UE 101 and discover GAS 113, EAS 123, and AS 140. In addition, GES 112 and EES 122 exchange EDGE-9 signaling to register UE 101 and discover GAS 113, EAS 123, and AS 140. GES 112 and GAS 113 exchange EDGE-3 signaling to set-up a user data session through GAS 113. EES 122 and EAS 123 exchange EDGE-3 signaling to set-up the user data session through EAS 123. APP 102 and GAS 113 exchange user data responsive to the EDGE-3 signaling from GES 112 and the EDGE-5 signaling from EEC 111. GAS 113 and EAS 123 exchange the user data responsive to the EDGE-3 signaling from GES 112 and EES 122. EAS 123 and CN 130 exchange the user data responsive to the EDGE-3 signaling from EES 122. CN 130 and AS 140 exchange the user data. GAS 113, EAS 123, and AS 140 deliver a low-latency service to APP 102.

EES 122 and CN 130 exchange EDGE-2 signaling to determine network information that characterizes the data exchange between APP 102 to AS 140. CN 130 transfers the network information to Distributed Ledger (DL) 150. DL 150 starts in a zero trust state and transitions to an alpha trust state for APP 102, GW 110, RAN 114, EDN 120, and CN 130 based on the network information. For example, DL 150 may check a UE ID, GW ID, EDN ID, CN ID, and AS ID, and their corresponding network addresses against authorized combinations of the IDs and network addresses for the UE location and the network slices in use. DL 150 uses MVC across the DL nodes to transition from zero trust to alpha trust.

Figure 4:
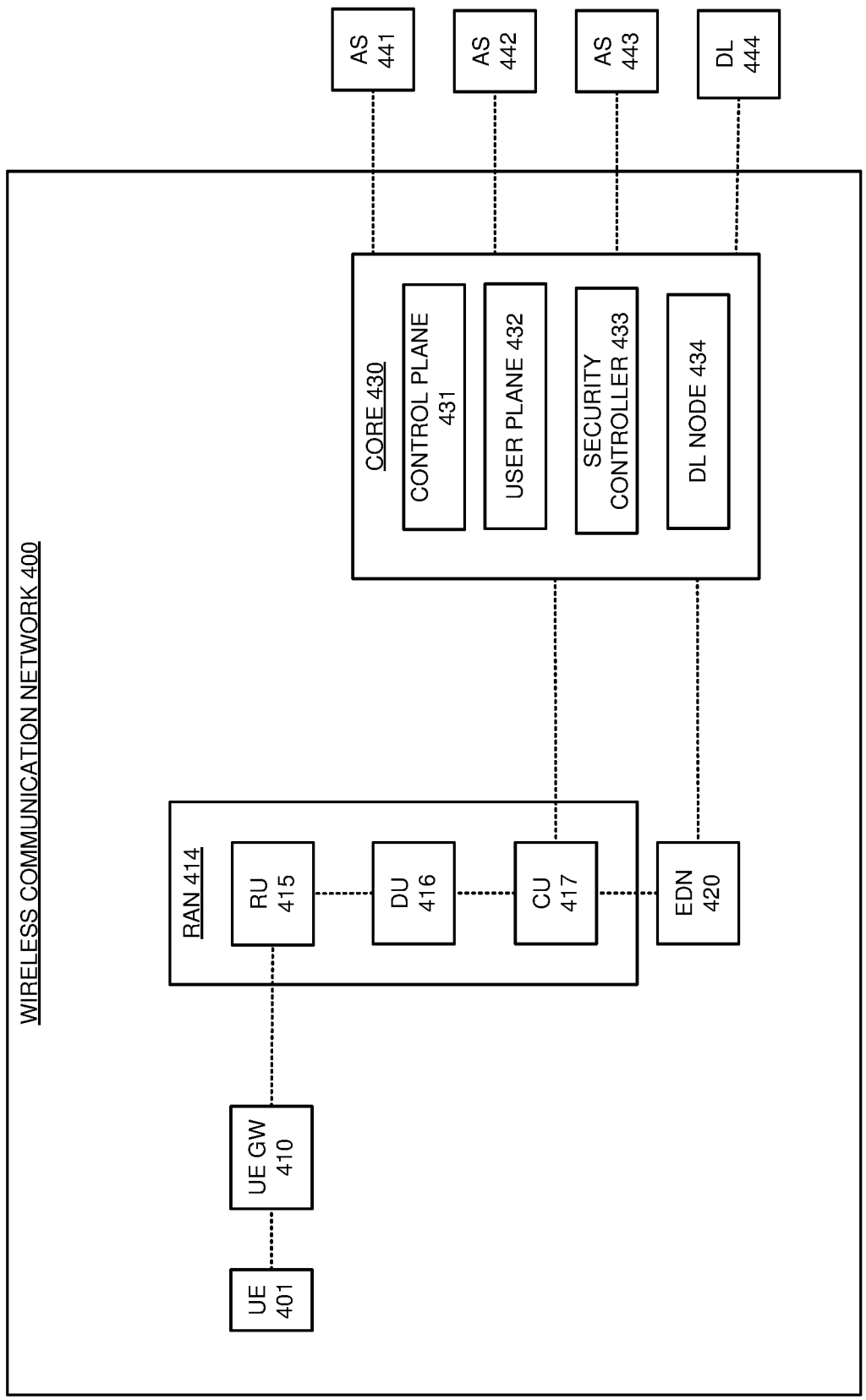
FIG. 4 illustrates a Fifth Generation (5G) wireless communication network to connect a user application in a UE to an AS over a GW, RAN, EDN, and CN.

FIG. 4 illustrates Fifth Generation (5G) wireless communication network 400 to connect user applications in UE 401 to AS 441-443 over UE GW 410, RAN 414, EDN 420, and Core 430. 5G wireless communication network 400 comprises an example of wireless communication network 100, although network 100 may differ. 5G wireless communication network 400 comprises UE 401, UE GW 410, RAN 414, EDN 420 and core 430. RAN 414 comprises Radio Unit (RU) 415, Distributed Unit (DU) 416, and Centralized Unit (CU) 417. Core 430 comprises control-plane 431, user-plane 432, security controller 433, and DL node 434.

UE 401 uses GW 410, RAN 414, EDN 420, and core 430 to communicate with AS 441-443. Security controller 433 receives related network data for UE 401, UE GW 410, RU 415, DU 416, CU 417, EDN 420, control plane 431, user plane 432, and AS 441-443. The network data comprises hardware IDs and network addresses that are typically hashed for security. In some examples, security controller 433 receives digital trust certificates from the elements that were obtained from a different security system. Security controller 433 transfers the network data to DL node 434 for trust determination. DL node 434 interacts with DL 444 to determine trust through Minimum Viable Consensus (MVC). DL node 434 and the other nodes in DL 444 match the hardware identifiers, network addresses, and/or digital trust certificates to expected values (or value prefixes) given the UE location and slice to establish trust using MVC. If any UE of slice fails hardware trust, then DL node 434 indicates the failing UE or slice to security controller 433. Security controller 433 drives core 430, EDN 420, RAN 414, GW 410, and UE 401 to isolate the failed UE or slice. DL node 434 and DL 444 maintain a blockchain record of the network information and the trust status for slices 450 and 460.

Figure 5:
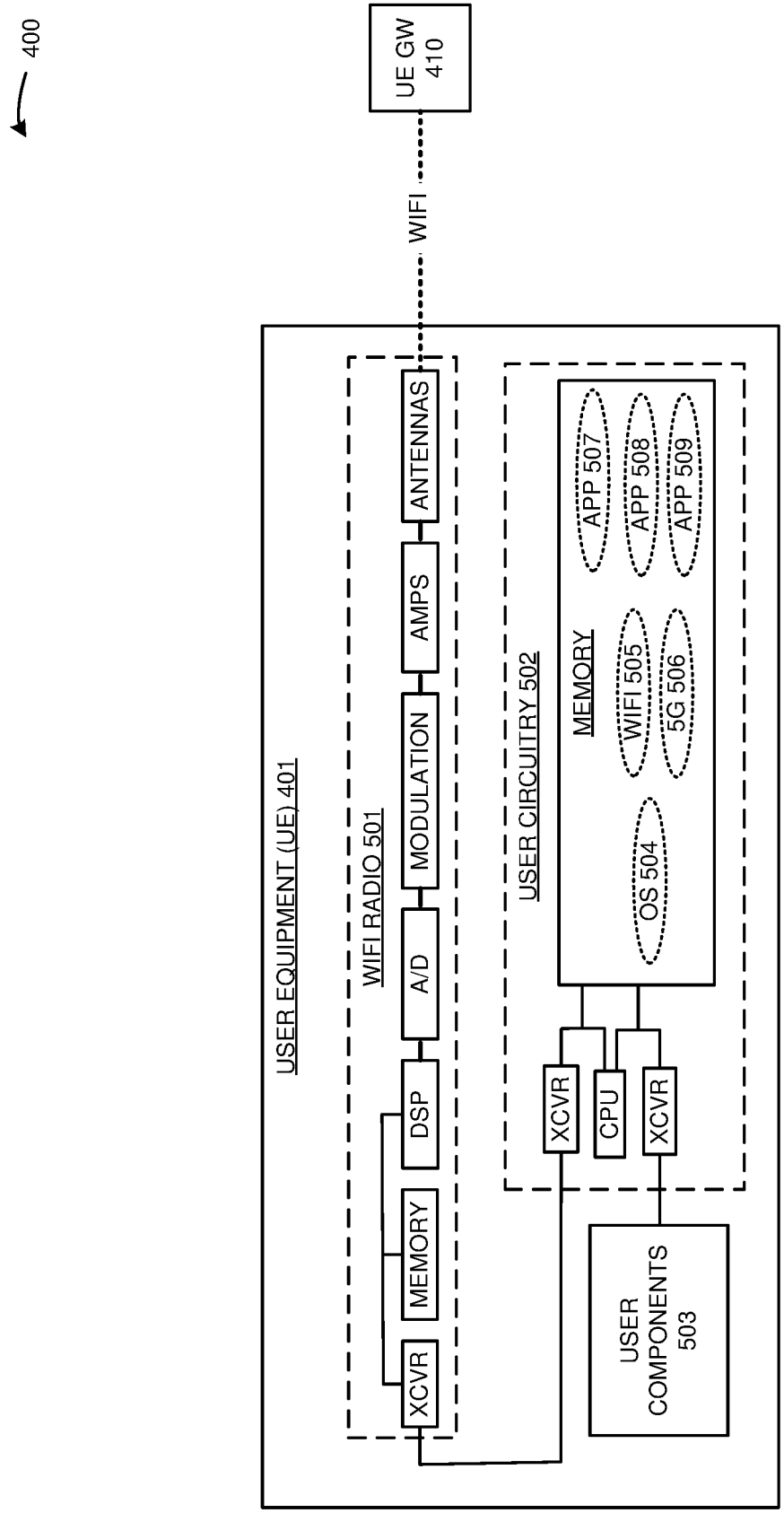
FIG. 5 illustrates the UE in the 5G wireless communication network.

FIG. 5 illustrates UE 401 in 5G wireless communication network 400. UE 401 comprises an example of UE 101, although UE 101 may differ. UE 401 comprises 5G New Radio (5GNR) radio 501, user circuitry 502, and user components 503. User components 503 comprise sensors, controllers, displays, or some other user apparatus that consumes wireless data service. 5GNR radio 501 comprises antennas, amplifiers, filters, modulation, analog-to-digital interfaces, DSP, memory, and transceivers that are coupled over bus circuitry. User circuitry 502 comprises memory, CPU, user interfaces and components, and transceivers that are coupled over bus circuitry. The memory in user circuitry 502 stores operating system (OS) 504, WIFI interface 505, 5G interface 506, user applications (APPs) 507-509. WIFI interface 505 comprises components like Physical Layer (PHY), Media Access Control (MAC), and Radio Link Control (RLC). 5G interface 506 comprises components like PHY, MAC, RLC, Packet Data Convergence Protocol (PDCP), Service Data Adaption Protocol (SDAP), and Radio Resource Control (RRC). The antennas in WIFI radio 501 are wirelessly coupled to UE GA 410 over a WIFI link Transceivers (XCVRs) in WIFI radio 501 are coupled to transceivers in user circuitry 502. Transceivers in user circuitry 502 are coupled to user components 503. The CPU in user circuitry 502 executes the operating system, interfaces, and user applications to exchange network signaling and user data with UE GW 410.

Figure 6:
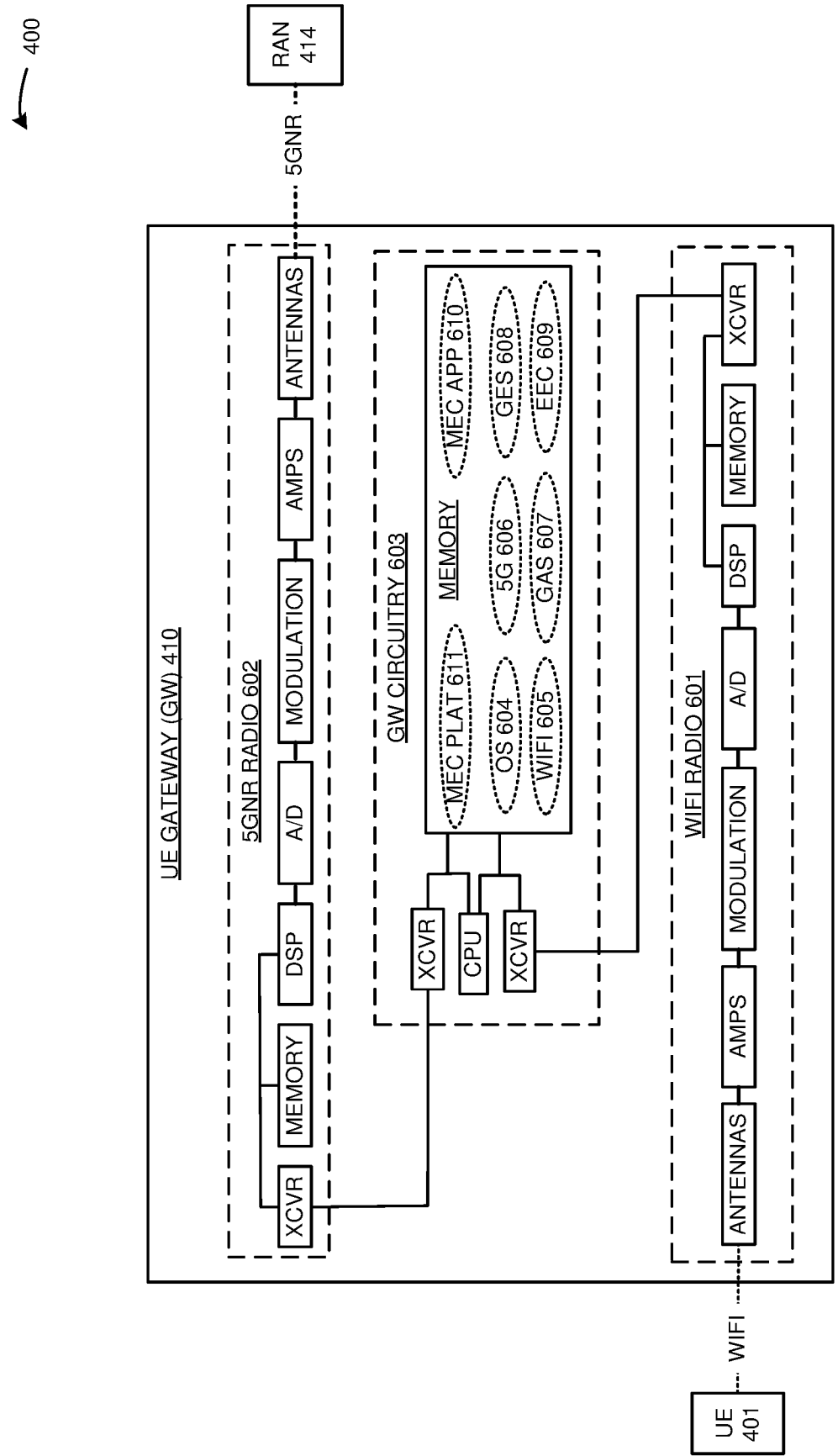
FIG. 6 illustrates the UE Gateway in the 5G wireless communication network.

FIG. 6 illustrates UE Gateway 410 in 5G wireless communication network 400. UE GW 410 comprises an example of UE GW 110, although UE GW 110 may differ. UE GW 410 comprises WIFI radio 601, 5GNR radio 602, and GW circuitry 603. Radios 601-602 comprise antennas, amplifiers, filters, modulation, analog-to-digital interfaces, DSP, memory, and transceivers that are coupled over bus circuitry. GW circuitry 603 comprises memory, CPU, user interfaces and components, and transceivers that are coupled over bus circuitry. The memory in GW circuitry 603 stores an OS 604, WIFI interface 605, 5G interface 606, GAS application 607, GES application 608, EEC application 609, Mobile Edge Compute (MEC) application 610, and MEC platform 611. WIFI interface 605 comprises components like PHY, MAC, and RLC. 5GNR interface 606 comprises components like PHY, MAC, RLC, PDCP, SDAP, and RRC. The antennas in WIFI radio 601 are wirelessly coupled to UE 401 over a WIFI link. The antennas in 5GNR radio 602 are wirelessly coupled to RAN 414 over a 5GNR link Transceivers (XCVRs) in radios 601-602 are coupled to transceivers in GW circuitry 603. The CPU in user circuitry 603 executes OS 604, WIFI 605, 5G 606, GAS 607, GES 608, EEC 609, MEC application 610, and MEC platform 611 to exchange network signaling and user data between UE 401 and RAN 414.

Figure 7:
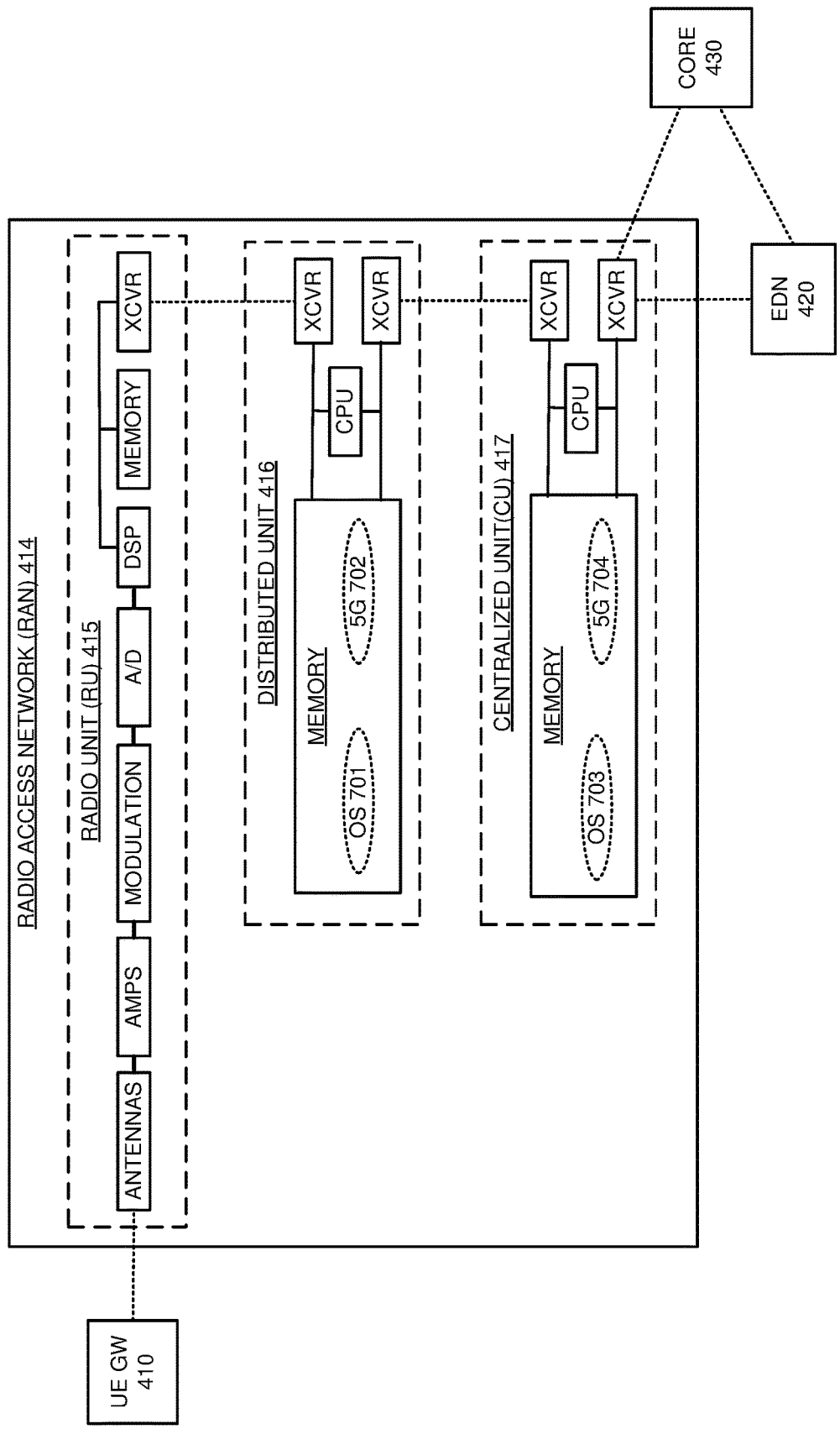
FIG. 7 illustrates the RAN in the 5G wireless communication network.

FIG. 7 illustrates RAN 414 in 5G wireless communication network 400. 5G RAN 411 comprises an example of RAN 114, although RAN 114 may differ. RAN 414 comprises RU 415, DU 416, and CU 417. RU 415 comprises 5GNR antennas, amplifiers, filters, modulation, analog-to-digital interfaces, DSP, memory, and transceivers that are coupled over bus circuitry. DU 416 comprises memory, CPU, user interfaces and components, and transceivers that are coupled over bus circuitry. The memory in DU 416 stores an OS 701 and 5G interface 702. 5GNR interface 702 comprises components like PHY, MAC, and RLC. CU 417 comprises memory, CPU, user interfaces and components, and transceivers that are coupled over bus circuitry. The memory in CU 417 stores an OS 703 and 5G interface 704. 5G interface 704 comprises components like PDCP, SDAP, and RRC. The antennas in RU 415 are wirelessly coupled to UE GW 410 over a 5GNR link Transceivers in RU 415 are coupled to transceivers in DU 416. Transceivers in DU 416 are coupled to transceivers in CU 417. Transceivers in CU 417 are coupled to EDN 420 and core 430. The CPU in RAN 414 execute OS 701, 5G 702, OS 703, and 5G 704 to exchange network signaling and user data with UE GW 410, EDN 420, and core 430. In particular, MEC application 610 is controlled by core 430 to support the execution of GAS 607 in GW 410. MEC platform 611 is controlled by core 430 to support the execution of GES 608 in GW 410.

Figure 8:
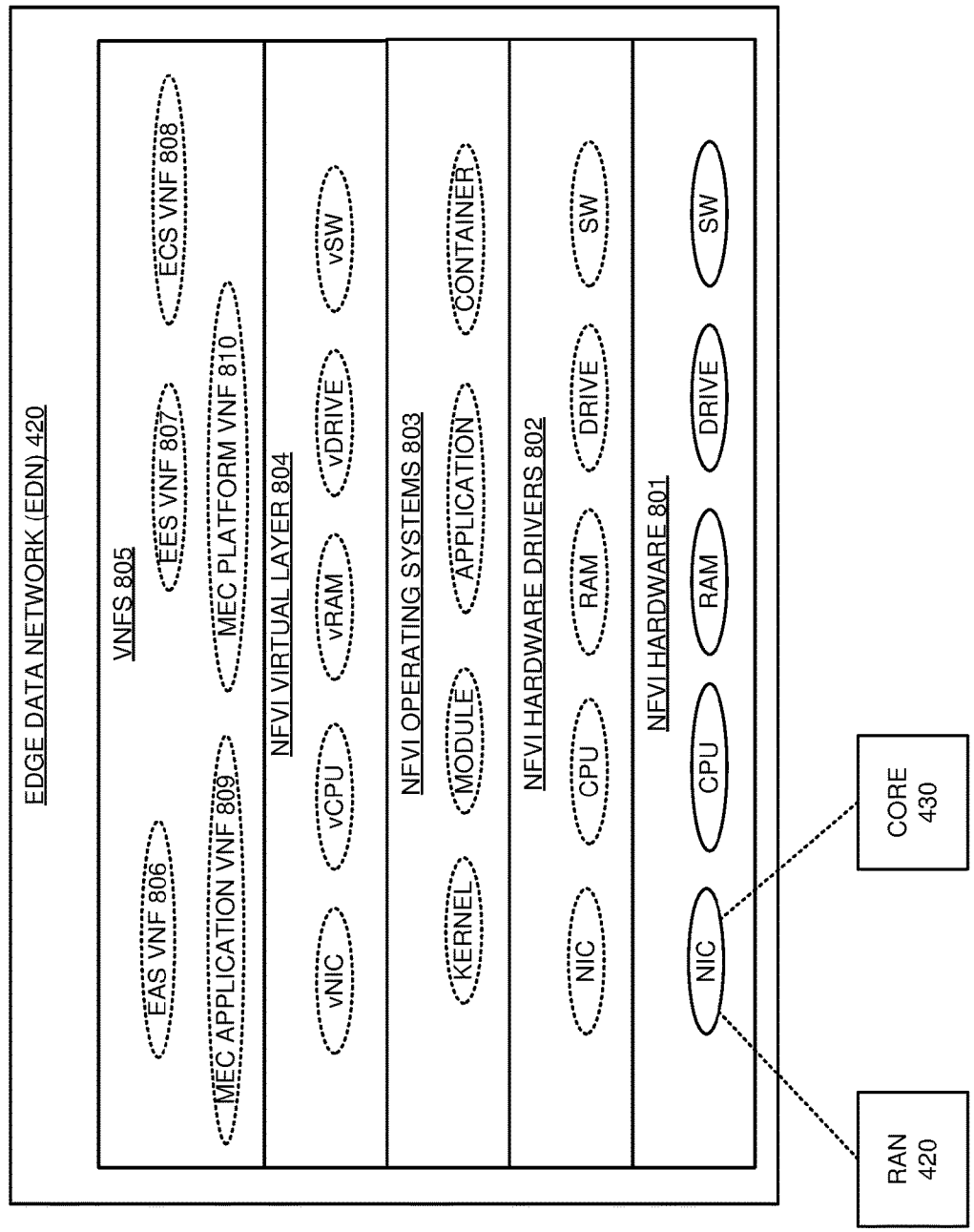
FIG. 8 illustrates the EDN in the 5G wireless communication network.

FIG. 8 illustrates EDN 420 in 5G wireless communication network 400. EDN 420 comprises an example of EDN 120, although EDN 120 may differ. EDN 420 comprises Network Function Virtualization Infrastructure (NFVI) hardware 801, NFVI hardware drivers 802, NFVI operating systems 803, NFVI virtual layer 804, and Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, and the like. NFVI virtual layer 804 comprises vNIC, vCPU, vRAM, vDRIVE, and vSW. VNFs 805 comprise EAS VNF 806, EES VNF 807, ECS VNF 808. MEC Application VNF 809, and MEC platform VNF 810. EDN 420 may be located at a single site or be distributed across multiple geographic locations. The NIC transceivers in NFVI hardware 801 are coupled to CU 417 and core 430. NFVI hardware 801 executes NFVI hardware drivers 802, NFVI operating systems 803, NFVI virtual layer 804, and VNFs 805 to form and operate an EAS, EES, ECS, MEC Application, and MEC Platform. In particular, MEC application 809 is controlled by core 430 to support the execution of EAS VNF 806 in EDN 420. MEC platform 810 is controlled by core 430 to support the execution of EES VNF 807 in EDN 420.

Figure 9:
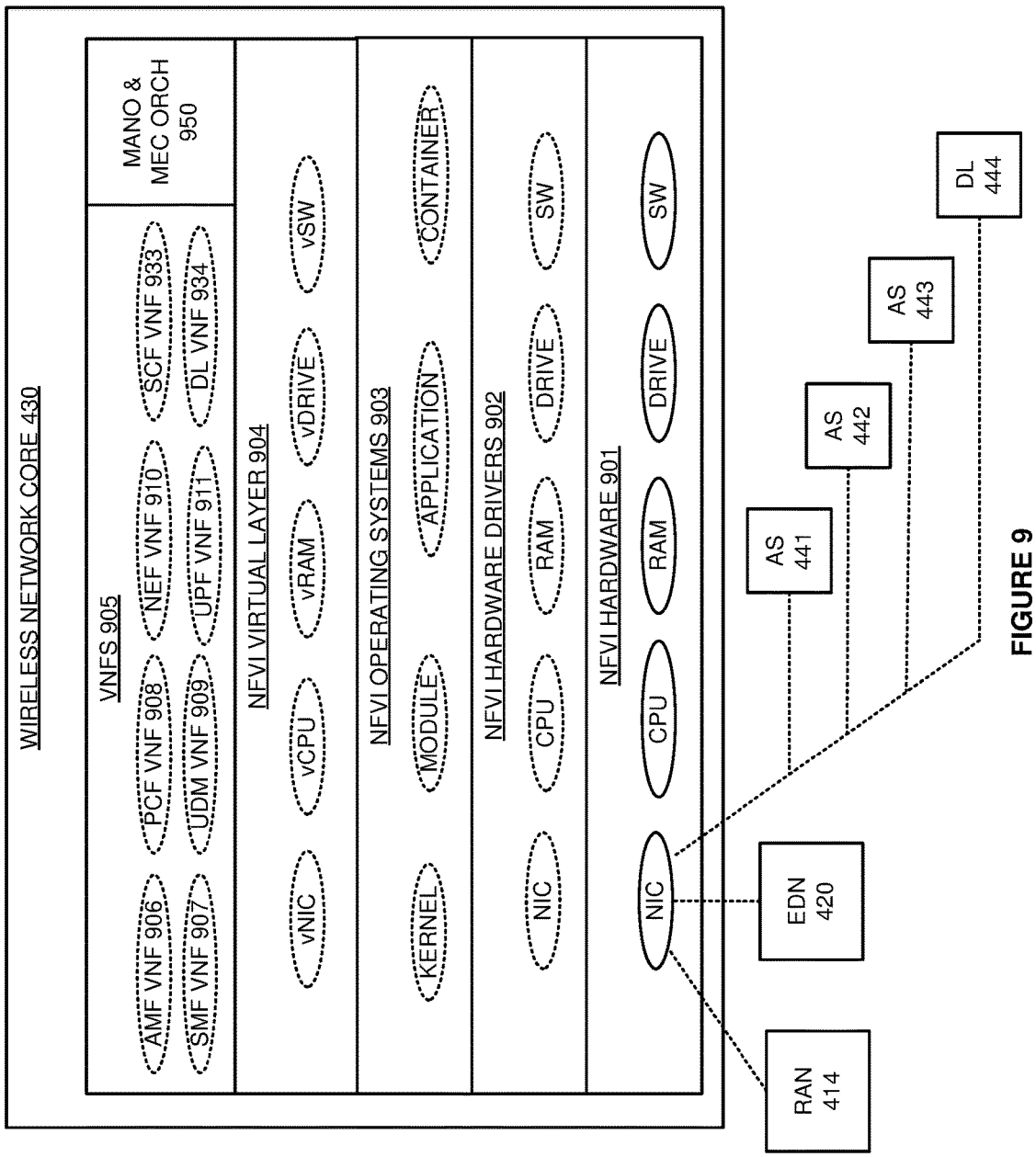
FIG. 9 illustrates the CN in the 5G wireless communication network.

FIG. 9 illustrates wireless network core 430 in 5G wireless communication network 400. Wireless network core 430 comprises an example of core 130, although core 130 may differ. Wireless network core 430 comprises NFVI hardware 901, NFVI hardware drivers 902, NFVI operating systems 903, NFVI virtual layer 904, VNFs 905, Management and Orchestration (MANO) and Mobile Edge Compute (MEC) 950. NFVI hardware 901 comprises NICs, CPU, RAM, DRIVE, and SW. NFVI hardware drivers 902 comprise software that is resident in the NIC, CPU, RAM, DRIVE, and SW. NFVI operating systems 903 comprise kernels, modules, applications, containers, and the like. NFVI virtual layer 904 comprises vNIC, vCPU, vRAM, vDRIVE, and vSW. VNFs 905 comprise Access and Mobility Management Function (AMF) VNF 906, Session Management Function VNF 907, Policy Control Function (PCF) VNF 908, Unified Data Management (UDM) VNF 909, Network Exposure Function (NEF) VNF 910, User Plane Function (UPF) VNF 911, Security Control Function (SCF) VNF 933, and Distributed Ledger (DL) VNF 934. Other VNFs like Network Repository Function (NRF) and Network Slice Selection Function (NSSF) are typically present but omitted for clarity. Wireless network core 430 may be located at a single site or be distributed across multiple geographic locations. The NIC transceivers in NFVI hardware 901 are coupled to RAN 414, EDN 420, AS 441-443, and DL 444. NFVI hardware 901 executes NFVI hardware drivers 902, NFVI operating systems 903, NFVI virtual layer 904, and VNFs 905 to form and operate an AMF, SMF, PCF, UDM, NEF, UPF, SCF, and DL node. Control plane 431 on FIG. 4 comprises an AMF, SMF, PCF, UDM, and NEF in core 430. User plane 432 on FIG. 4 comprises a UPF in core 430. MANO and MEC 450 control the MEC Applications and MEC Platforms in EDN 420.

Figure 10:
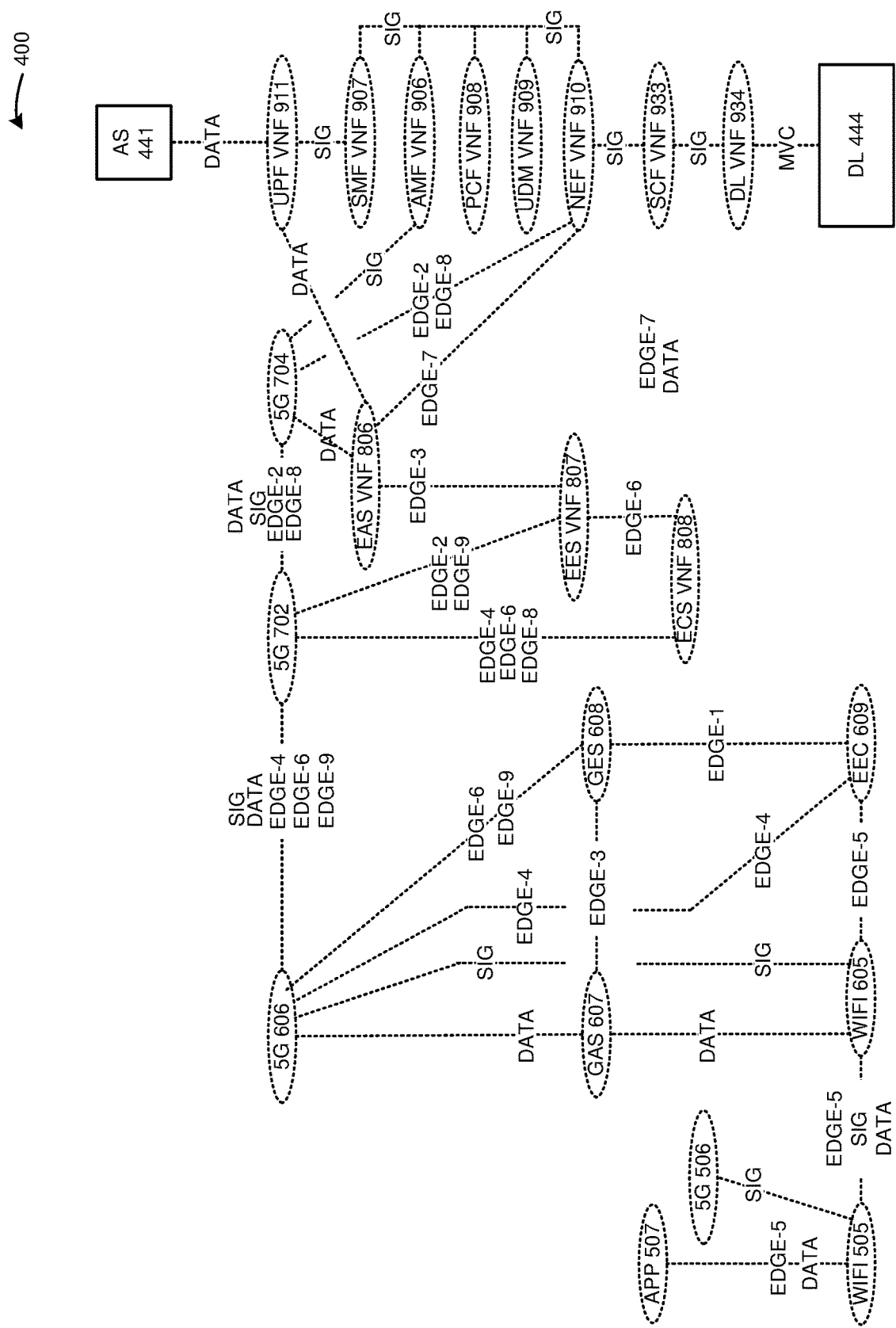
Figure 11:
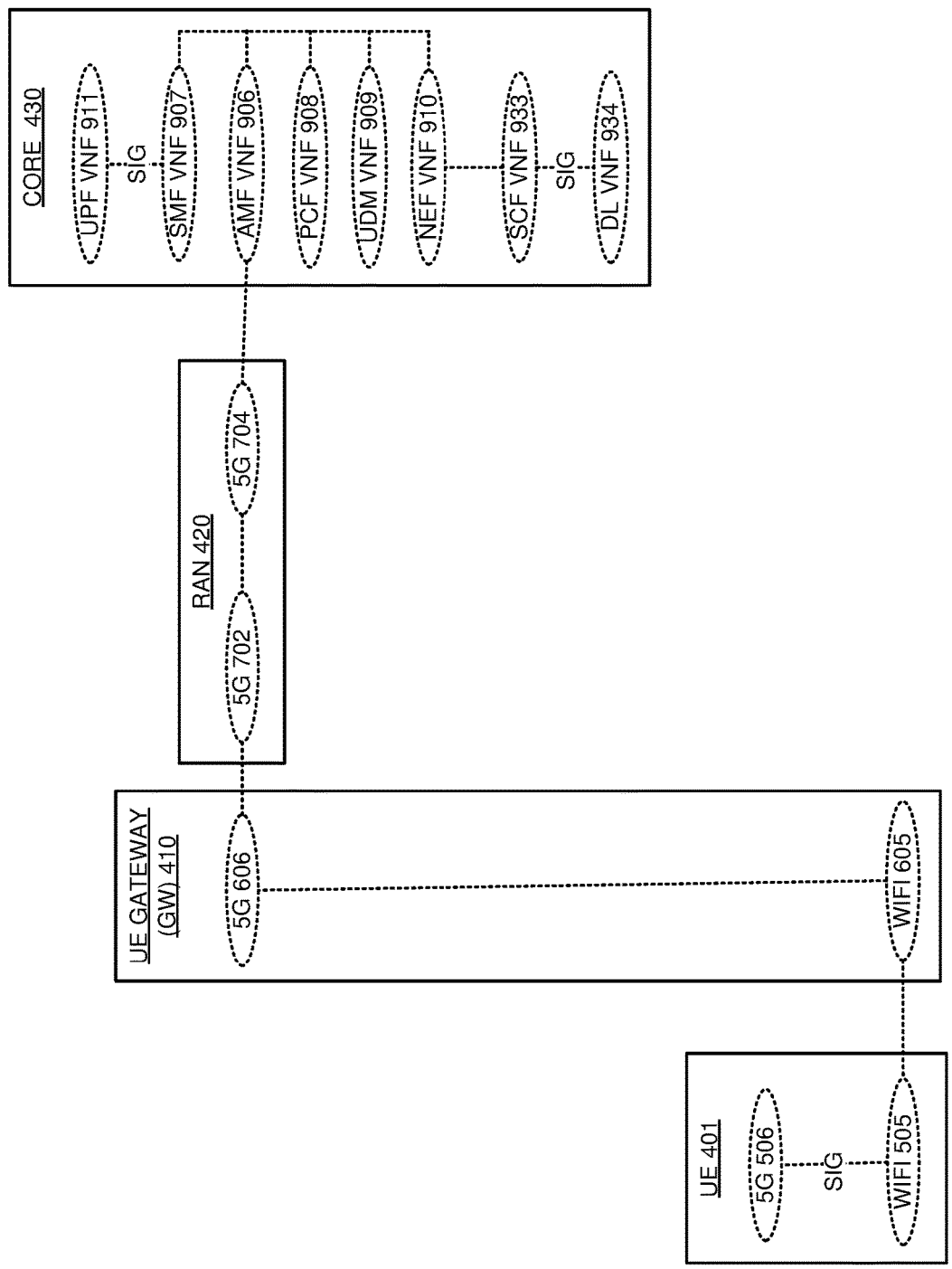
Figure 12:
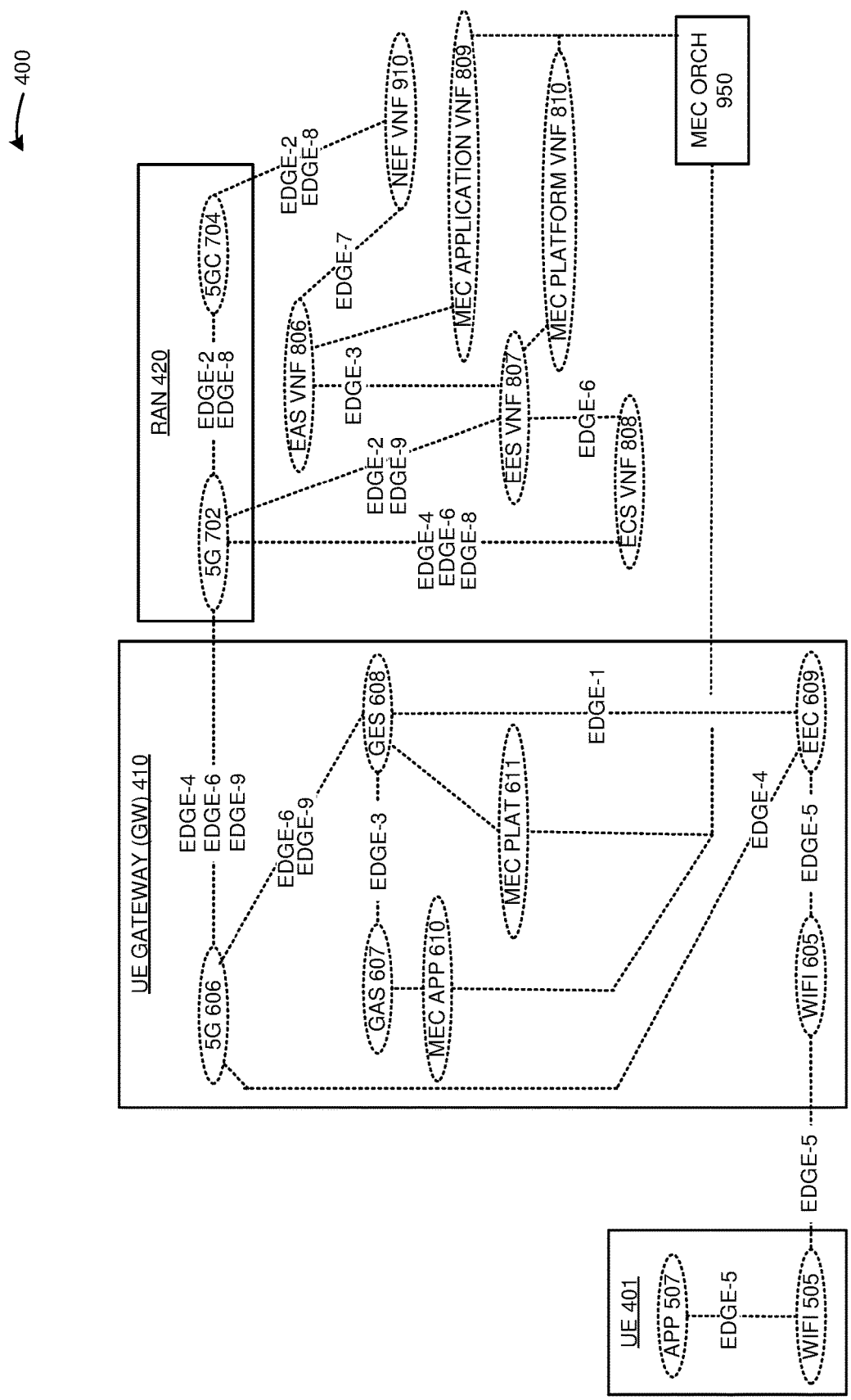
Figure 13:
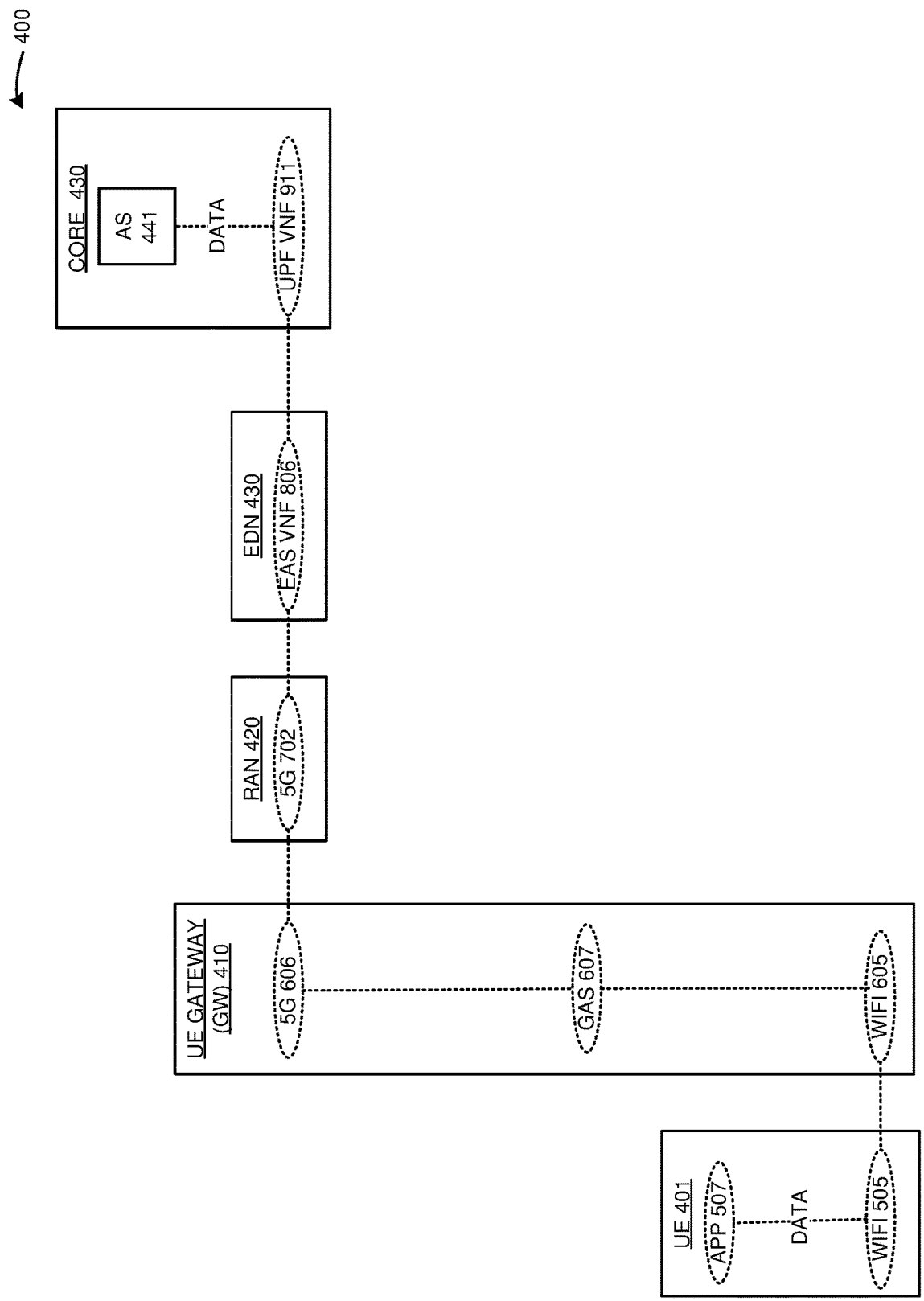

FIG. 10 illustrates an exemplary operation of 5G wireless communication network 400 to connect APP 507 in UE 401 to AS 441. FIGS. 11-13 respectively describe the core-control plane, edge control-plane, and user-plane operations in more detail. Referring to FIG. 10, APP 507 in UE 401 communicates with AS 441 over WIFI 505 in UE 401, WIFI 605 in GW 410, GAS 607 in GW 410, 5G 606 in GW 410, 5G 702 in DU 416, 5G 704 in CU 417, EAS VNF 806 in EDN 420, and UPF VNF 911 in core 430. GES 608 transfers related network data (and possibly digital certificates) to EES VNF 807. EES VNF 807 transfers related network data (and possibly digital certificates) to NEF VNF 910 over EDGE-2. NEF VNF 910 signals the related network data (and possibly digital certificates) to SCF VNF 933. SCF VNF 933. SCF VNF 933 transfers the related network data (and possibly digital certificates) to DL VNF 934. The network data comprises hardware identifiers, network addresses, and possibly digital certificates for APP 507, GAS 607, EAS VNF 806, UPF VNF 911, AS 441, and possibly other components. DL VNF 934 interacts with DL 444 to determine trust based on the hardware identifiers, network addresses, and possibly digital certificates using MVC and expected value ranges.

FIG. 11 illustrates an exemplary operation of the network control-plane in 5G wireless communication network to connect the user application in the UE to the AS. The operation may vary in other examples. 5G 606 (RRC) in GW 410 attaches to 5G 704 (RRC) in CU 417 over 5G 702 in DU 416. WIFI 505 in UE 401 attaches to WIFI 605 in GW 410. 5G 506 in UE 401 (RRC) attaches to 5G 704 (RRC) in CU 417. 5G 506 (RRC) registers with AMF VNF 906. AMF VNF 906 authenticates UE 401 and selects slices and policies for UE 401. The slices comprise GAS, EAS, UPF, and AS. AMF VNF 906 signals the slices and policies for UE 401 to SMF VNF 907. SMF VNF 907 drives UPF VNF 911 (and possibly other UPFs) to serve UE 401 per the slices and policies. AMF VNF 906 signals the slices and policies for UE 401 to EDN 420—possibly over NEF VNF 910. AMF VNF 906 signals the slices and policies for UE 401 to 5G 704 in CU 417 for delivery to 5G 702 in DU 416, 5G 606 GW 410, and 5G 506 UE 401.

FIG. 12 illustrates an exemplary operation of the edge control-plane in 5G wireless communication network 400 to connect user application 507 in UE 401 to AS 411. The operation may vary in other examples. NEF VNF 910 in core 430 and ECS VNF 808 in EDN 420 exchange EDGE-8 signaling to expose network capabilities like UE location and session quality. NEF VNF 910 and EES VNF 807 in EDN 420 exchange EDGE-2 signaling to expose network capabilities to EES VNF 807. EES VNF 807 and GES 608 in GW 410 exchange EDGE-2 signaling to expose the network capabilities. NEF VNF 910 and EAS VNF 806 exchange EDGE-7 signaling to configure EAS VNF 806 and transfer EAS information to NEF VNF 910. EAS VNF 806 and NEF VNF 910 exchange EDGE-7 signaling to configure GAS 122 and transfer GAS information to NEF VNF 910. EEC 609 in GW 410 and ECS VNF 808 in EDN 420 exchange EDGE-4 signaling to provision EEC 609 and to discover network information like EES, data network name, and slice from ECS VNF 808. EES VNF 807 and ECS VNF 808 in EDN 420 exchange EDGE-6 signaling to configure EES VNF 807 and transfer EES information to ECS VNF 808. GES 608 in GW 410 and ECS VNF 808 in EDN 420 exchange EDGE-6 signaling to configure GES 608 and transfer GES information to ECS VNF 808.

APP 507 102 and EEC 609 exchange EDGE-5 signaling to initiate service for APP 507 over GES 608. EEC 609 and GES 608 exchange EDGE-1 signaling to register UE 401 and discover GAS 607, EAS VNF 806, and AS 441. In addition, GES 608 and EES VNF 807 exchange EDGE-9 signaling to register UE 401 and discover GAS 607, EAS VNF 806, and AS 441. GES 608 and GAS 607 exchange EDGE-3 signaling to set-up a user data session through GAS 607. EES VNF 807 and EAS VNF 806 exchange EDGE-3 signaling to set-up the user data session through EAS VNF 806. EES VNF 807 and NEF VNF 910 exchange EDGE-2 signaling to transfer the network information and possibly digital certificates that characterize the data exchange.

Referring back to FIG. 11, SCF VNF 933 transfers the network information to DL VNF 934. DL VNF 934 starts in a zero trust state and transitions to an alpha trust state for APP 507, GW 410, RAN 414, EDN 420, core 430, and AS 441 based on the network information. For example, DL VNF 934 150 may check a UE ID, GW ID, EDN ID, UPF ID, and AS ID, and their corresponding network addresses against authorized combinations of the IDs and network addresses for the UE location and network slices in use. DL VNF 934 uses MVC to transition from zero trust to alpha trust when the network information falls within expected value ranges.

FIG. 13 illustrates an exemplary operation of the user-plane 5G wireless communication network 400 to connect APP 507 in UE 401 to AS 441. The operation may vary in other examples. APP 507 and GAS 607 exchange user data over WIFI 505 and WIFI 605 responsive to the EDGE-3 signaling and the EDGE-5 signaling. GAS 607 and EAS VNF 806 exchange the user data over 5G 606 and 5G 702 responsive to EDGE-3 signaling. EAS VNF 806 and UPF VNF 911 exchange the user data responsive to EDGE-3 signaling and network signaling. UPF VNF 911 and AS 441 exchange the user data response to network signaling. AS 441, EAS VNF 806, and GAS 607 deliver a low-latency service to APP 507.

The wireless data network circuitry described above comprises computer hardware and software that form special-purpose networking circuitry to connect user applications in UEs to AS. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to connect user applications in UEs to AS.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to connect a user application in a wireless User Equipment (UE) to a user application server, the method comprising:
   exchanging user data between the user application in the wireless UE and a wireless network slice over an edge application server;
   exchanging the user data between the edge application server and the user application server over the wireless network slice;
   matching network information related to the exchange of the user data with an expected network value and interacting with distributed ledger nodes to reach a consensus based on the matching, wherein the consensus is reached when a minimum amount of the distributed ledger nodes match the network information with the expected network value; and
   in response to the consensus, determining a trust level for the exchange of the user data between the user application in the wireless UE and the user application server.

2. The method of claim 1 wherein matching the network information related to the exchange of the user data with the expected network value comprises matching a slice identifier for the wireless network slice with an expected slice identifier for the wireless network slice and matching an edge identifier for the edge application server with an expected edge identifier for the edge application server.

3. The method of claim 1 wherein matching the network information related to the exchange of the user data with the expected network value comprises matching a slice identifier for the wireless network slice with an expected slice identifier for the wireless network slice, matching an edge identifier for the edge application server with an expected edge identifier for the edge application server, and matching at least one of an application identifier for the user application with an expected application identifier for the user application and a UE identifier for the wireless UE with an expected UE identifier for the wireless UE.

4. The method of claim 1 wherein matching the network information related to the exchange of the user data with the expected network value comprises matching a server identifier for the user application server with an expected server identifier for the user application server, matching a slice identifier for the wireless network slice with an expected slice identifier for the wireless network slice, matching an edge identifier for the edge application server with an expected edge identifier for the edge application server, and matching at least one of an application identifier for the user application with an expected application identifier for the user application and a UE identifier for the wireless UE with an expected UE identifier for the wireless UE.

5. The method of claim 1 wherein matching the network information related to the exchange of the user data with the expected network value comprises matching a slice network address for the wireless network slice with an expected slice network address for the wireless network slice and matching an edge network address for the edge application server with an expected edge network address for the edge application server.

6. The method of claim 1 wherein matching the network information related to the exchange of the user data with the expected network value comprises matching a slice network address for the wireless network slice with an expected slice network address for the wireless network slice, matching an edge network address for the edge application server with an expected edge network address for the edge application server, and matching a UE network address for the wireless UE with an expected UE network address for the wireless UE.

7. The method of claim 1 wherein matching the network information related to the exchange of the user data with the expected network value comprises matching a server network address for the user application server with an expected server network address for the user application server, matching a slice network address for the wireless network slice with an expected slice network address for the wireless network slice, matching an edge network address for the edge application server with an expected edge network address for the edge application server, and matching a UE network address for the wireless UE with an expected UE network address for the wireless UE.

8. The method of claim 1 wherein matching the network information related to the exchange of the user data with the expected network value comprises matching a slice digital certificate from the wireless network slice with an expected slice digital certificate value for the wireless network slice and matching an edge digital certificate from the edge application server with an expected edge digital certificate value for the edge application server.

9. The method of claim 1 wherein matching the network information related to the exchange of the user data with the expected network value comprises matching a slice digital certificate from the wireless network slice with an expected slice digital certificate value for the wireless network slice, matching an edge digital certificate from the edge application server with an expected edge digital certificate value for the edge application server, and matching at least one of an application digital certificate from the user application with an expected application digital certificate value for the user application and a UE digital certificate from the wireless UE with an expected UE digital certificate value for the wireless UE.

10. The method of claim 1 wherein matching the network information related to the exchange of the user data with the expected network value comprises matching a server digital certificate from the user application server with an expected server digital certificate value for the user application server, matching a slice digital certificate from the wireless network slice with an expected slice digital certificate value for the wireless network slice, matching an edge digital certificate from the edge application server with an expected edge digital certificate value for the edge application server, and matching at least one of an application digital certificate from the user application with an expected application digital certificate value for the user applications and a UE digital certificate from the wireless UE with an expected UE digital certificate value for the wireless UE.

11. A method to connect a user application in a wireless User Equipment (UE) to a user application server, the method comprising:
- a user data gateway exchanging user data between the user application in the wireless UE and an edge data network;
- the edge data network exchanging the user data between the user data gateway and a core data network;
- the core data network exchanging the user data between the edge data network and the user application server;
- a distributed ledger node in a distributed ledger matching network information related to the exchange of the user data with an expected network value and interacting with other distributed ledger nodes in the distributed ledger to reach a consensus based on the matching, wherein the consensus is reached when a minimum amount of the distributed ledger nodes match the network information with the expected network value; and
- in response to the consensus, the distributed ledger determining a trust level for the exchange of the user data between the user application in the wireless UE and the user application server.

12. The method of claim 11 wherein the distributed ledger node interacting with the other distributed ledger nodes in the distributed ledger to reach the consensus comprises interacting with the other distributed ledger nodes in the distributed ledger to reach a Minimum Viable Consensus (MVC).

13. The method of claim 11 wherein the user application comprises a low-latency data application.

14. The method of claim 11 wherein the distributed ledger node matching the network information related to the exchange of the user data with the expected network value comprises matching server information for the user application server with expected server information for the user application server, matching core network information for the core data network with expected core network information for the core data network, matching edge information for the edge data network with expected edge information for the edge data network, matching gateway information for the user data gateway with expected gateway information for the user data gateway, and matching at least one of application information for the user application with expected application information for the user application and UE information for the wireless UE with expected UE information for the wireless UE.

15. A data communication network to connect a user application in a wireless User Equipment (UE) to a user application server, the data communication network comprising:
- an edge application server configured to exchange user data between the user application in the wireless UE and a wireless network slice;
- the wireless network slice configured to exchange the user data between the edge application server and the user application server;
- a distributed ledger node in a distributed ledger configured to match network information related to the exchange of the user data with an expected network value and interact with other distributed ledger nodes in the distributed ledger to reach a consensus based on the matching, wherein the consensus is reached when a minimum amount of the distributed ledger nodes match the network information with the expected network value; and
- in response to the consensus, the distributed ledger configured to determine a trust level for the exchange of the user data between the user application in the wireless UE and the user application server.

16. The data communication network of claim 15 wherein the distributed ledger node is further configured to match server information for the user application server with expected server information for the user application server, match slice information for the wireless network slice with expected slice information for the wireless network slice, match edge information for the edge application server with expected edge information for the edge application server, and match at least one of application information for the user application with expected application information for the user application and UE information for the wireless UE with expected UE information for the wireless UE.

17. The data communication network of claim 15 wherein the distributed ledger node is further configured to interact with the other distributed ledger nodes in the distributed ledger to reach a Minimum Viable Consensus (MVC).

18. The data communication network of claim 15 wherein the user application comprises a low-latency data application.

19. The data communication network of claim 15 wherein the user application comprises an augmented-reality application.

20. The data communication network of claim 15 wherein the user application comprises a hosted-computing application.

* * * * *